July 13, 1948.

H. H. HITTSON

2,445,175

VARIABLE THROW VIBRATORY HEAD FOR
SCREENS, CONVEYERS, AND THE LIKE

Filed June 13, 1947

INVENTOR,
Harken H. Hittson

July 13, 1948.

H. H. HITTSON 2,445,175

VARIABLE THROW VIBRATORY HEAD FOR
SCREENS, CONVEYERS, AND THE LIKE

Filed June 13, 1947

INVENTOR,
Harlen H. Hittson

July 13, 1948.  H. H. HITTSON  2,445,175
VARIABLE THROW VIBRATORY HEAD FOR
SCREENS, CONVEYERS, AND THE LIKE Filed June 13, 1947  9 Sheets-Sheet 6

INVENTOR;
Harker H. Hittson

July 13, 1948.

H. H. HITTSON

2,445,175

VARIABLE THROW VIBRATORY HEAD FOR
SCREENS, CONVEYERS, AND THE LIKE

Filed June 13, 1947

INVENTOR;
Harlan H. Hittson.

July 13, 1948.                     H. H. HITTSON                    2,445,175
                        VARIABLE THROW VIBRATORY HEAD FOR
                          SCREENS, CONVEYERS, AND THE LIKE
Filed June 13, 1947                                          9 Sheets-Sheet 9

INVENTOR;
Harlee H. Hittson

Patented July 13, 1948

2,445,175

UNITED STATES PATENT OFFICE 2,445,175

VARIABLE THROW VIBRATORY HEAD FOR SCREENS, CONVEYERS, AND THE LIKE

Harker H. Hittson, Upper Arlington, Ohio, assignor to The Jeffrey Manufacturing Company, a corporation of Ohio Application June 13, 1947, Serial No. 754,582

27 Claims. (Cl. 74—61)

1

This invention relates to a vibratory head for a screen, conveyer, barrel packer, shakeout, or the like, and an object of the invention is to provide improved mechanism of this type in which the forces developed or the amplitude of vibration imparted to the attached mechanism may be adjusted while the device is running.

A further object of the invention is to provide an improved screen, feeder, or other vibratable deck with adjustable throw or force thrusting mechanism which will cause it to vibrate at variable amplitude or with variable force, which adjustment can be carried out while the machine is in operation.

A further object of the invention is to provide improved mechanism for driving a pair of shafts, preferably concentric, in synchronism and for adjusting their phase relation while in operation, with provision for adjusting the relative positions of the drive mechanism and the drive shafts.

A further object of the invention is to provide an improved conveyer, or the like, with a differential vibratory head in which the amplitude of vibration or the conveying action may be adjusted while the machine is in operation.

Other objects of the invention will appear hereinafter, the novel features and combinations being set forth in the appended claims.

In the accompanying drawings.

2

Figure 1:
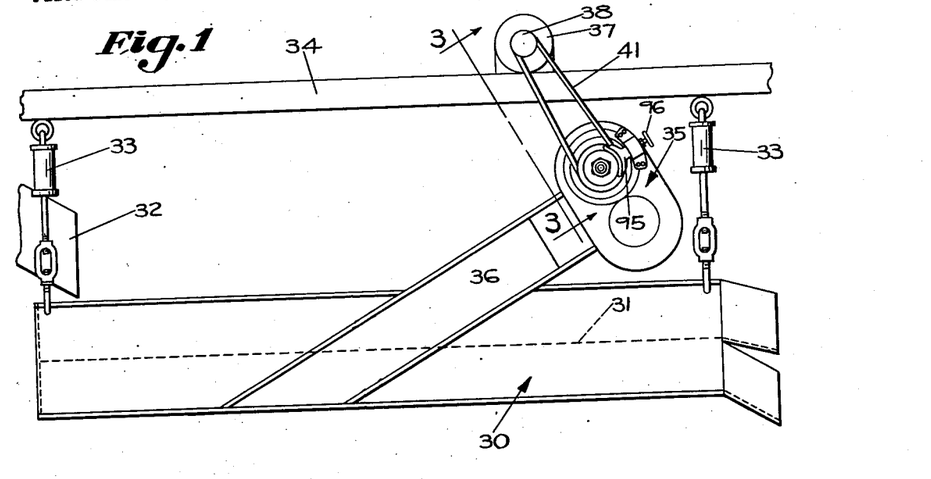
Fig. 1 is a side elevational view of apparatus incorporating my invention.

In Fig. 1 of the drawings there is illustrated a combination conveyer and screen including a deck 30 which is provided with a transverse screen 31 adapted to deliver oversize material to a chute, the undersize material passing through the screen 31 and being conveyed over the bottom of the deck 30 to a separate chute. Material may be fed to the deck 30 by a feed chute 32. The deck 30 is supported for vibratory movement by any desired means, such as spring hanger mechanisms 33, attached to a building frame, superstructure, or the like, 34. The deck 30 is merely illustrative of any form of deck which is mounted for vibratory motion, upon which material is to be vibrated for the purpose of screening, conveying, or the like.

It has long been desirable to supply some simple vibratory mechanism to such a deck, as deck 30, in which the amplitude of vibration of the deck or the forces of the vibratory motion may be adjusted between wide limits, for example, from zero amplitude to a maximum, while the unit is in operation. This is desirable whether rectilinear or non-rectilinear vibration is imparted to the deck.

I have provided an improved vibratory head and driving and adjusting mechanism for this purpose, the vibratory head being seen at 35 and being mounted upon supporting arms 36 which are rigidly attached to the deck 30 and the axis of which is along the axis of vibration of the vibratory head 35 which in the preferred form of the invention is so designed as to develop rectilinear vibratory motion.

The details of the vibratory head 35 and its driving and adjusting mechanism will be described hereinafter. For the time being it is sufficient to say that it is driven from an electric motor, or the like, 37, which may be mounted on the superstructure 34, there being a pair of drive pulleys 38 on the shaft of motor 37 and a pair of driven pulleys 39 and 40 on the head 35, which pulleys 39 and 40 are driven by separate V-belts 41 and 42, respectively.

Figures 2, 3, 4:
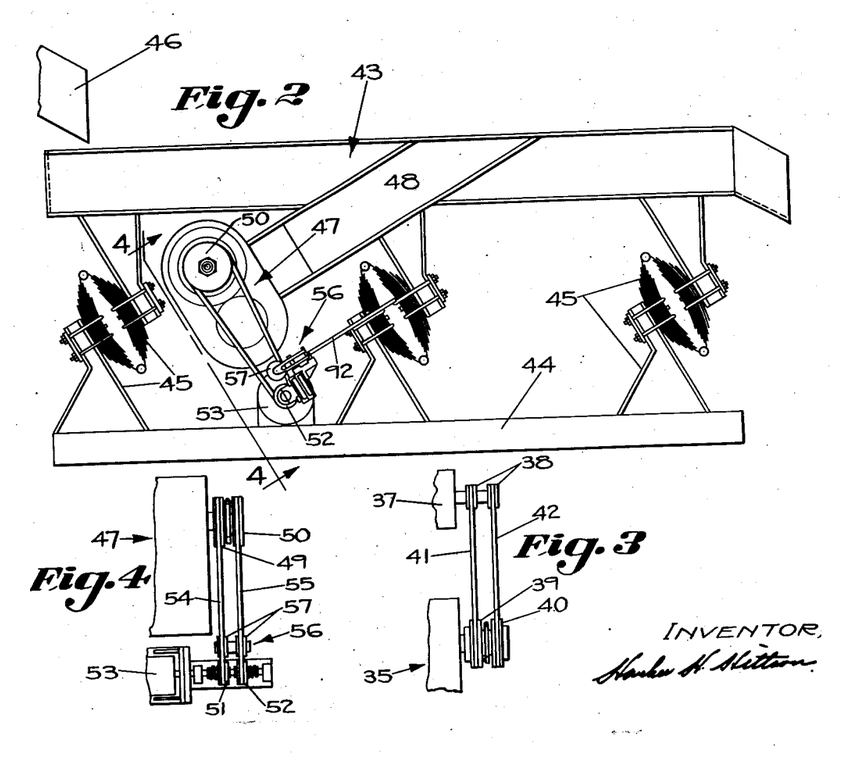
Fig. 2 is a side elevational view of a modified form of apparatus incorporating my invention.
Fig. 3 is a diagrammatic view on the line 3—3 of Fig. 1, showing the drive between the motor and the head.
Fig. 4 is a diagrammatic view on the line 4—4 of Fig. 2, showing the drive between the motor and the head.

In Fig. 2 of the drawings there is a conveyer deck 43 mounted for rectilinear vibratory movement from a base 44 by means of bracket and spring means 45. Material to be conveyed by the deck 43 will be delivered by chute 46 and will flow from the deck 43 over a chute at the right-hand end, as viewed in Fig. 2 of the drawings.

Vibratory motion is imparted to the deck 43 by means of a head 47 which is connected to arms 48 rigid with the deck 43, the axes of the arms 48 being inclined about the axis of the deck 43 along a line which is parallel with a rectilinear axis of vibration of the head 47. In certain details the head 47 differs from the head 35, as shall hereinafter be pointed out in detail. In addition, the drive mechanism for the head 47 differs from that for the head 35, as hereinafter described more completely.

For the moment it is adequate to note that the head 47 has two separate driven pulleys 49 and 50 driven from individual spring-biased pulleys 51 and 52, respectively, which are driving pulleys and are driven by a motor 53. Individual V-belts 54 and 55 interconnect pulleys 49 and 51 and 50 and 52, respectively. There is also phase shifting mechanism 56 for the two pulleys 49 and 50, including a pair of adjustable idler rollers 57. The detailed structure of each of the broadly described elements is hereinafter described in detail.

Figure 5:
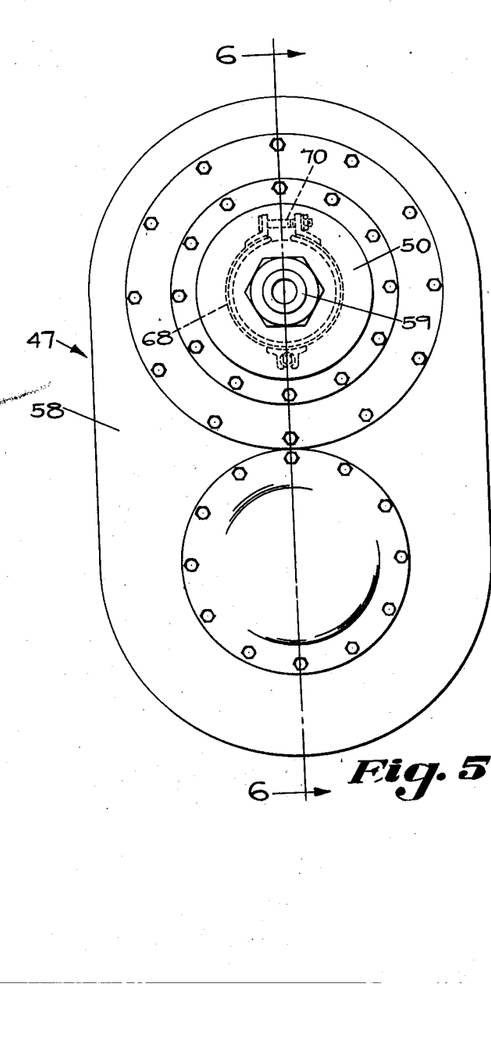
Fig. 5 is an end view of the vibratory head shown in Fig. 2 of the drawings.
Figure 6:
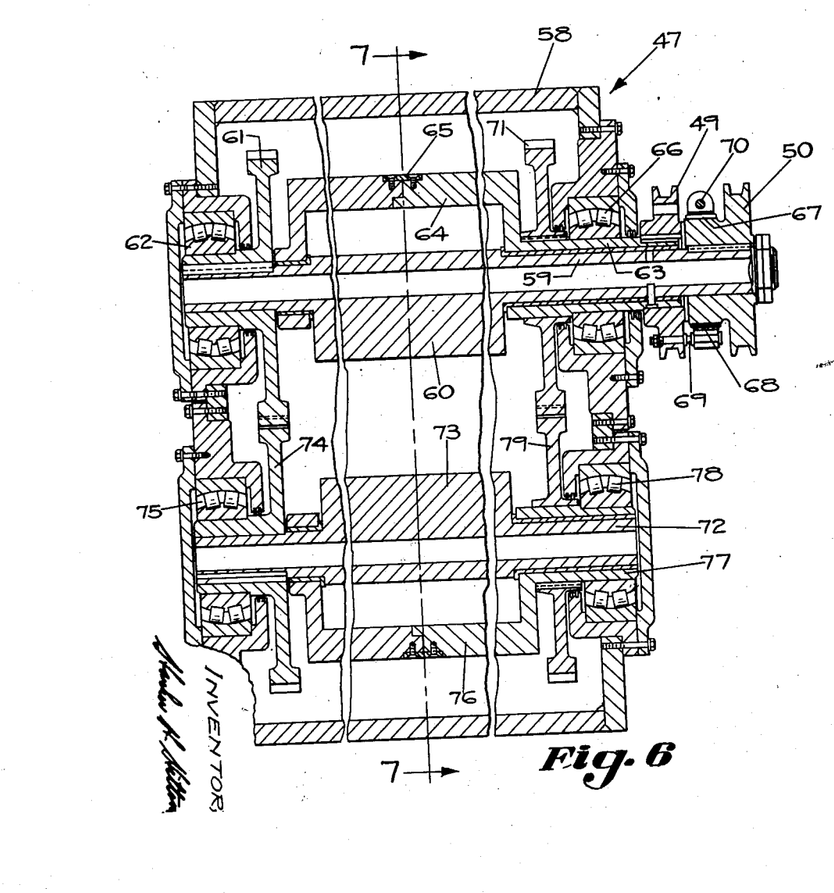
Fig. 6 is a sectional view on the line 6—6 of Fig. 5.
Figure 7:
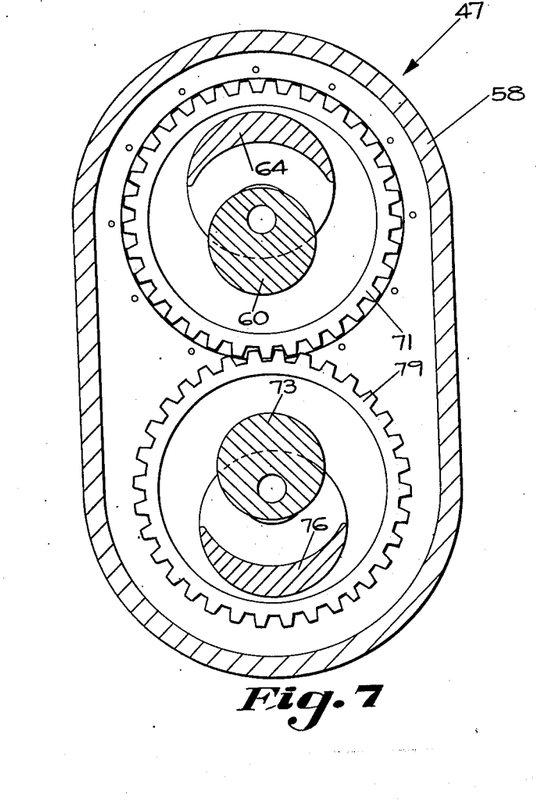
Fig. 7 is a sectional view on the line 7—7 of Fig. 6.

Attention is now directed particularly to Figs. 5, 6 and 7 of the drawings and to the structure of the vibratory head 47. Said head 47 includes a generally oval casing 58. Extending transversely of the casing 58 is a shaft 59 which at its center is provided with an eccentric or unbalanced weight 60. The left-hand end of shaft 59 carries a gear 61, the hub of which is keyed thereto and is mounted on an anti-friction bearing 62 carried in a receiving cup in a side wall of the casing 58. A shaft 63 concentric with the shaft 59 is journaled thereon and carries an eccentric or unbalanced weight 64 which is split in its middle and preferably connected by connecting means 65 to provide for its attachment to shaft 59, it being journaled thereto at opposite ends of the eccentric weight 64, as clearly illustrated in Fig. 6 of the drawings.

As best illustrated in Fig. 7 of the drawings, the eccentric weight 60 is adapted to rotate about the axis of shaft 59 within the eccentric weight 64. The shaft 63 is mounted in an anti-friction roller bearing 66 in one of the end plates of the housing 58, and this bearing, of course, acts to support the adjacent portion of shaft 59, since it is journaled within shaft 63. Shafts 59 and 63 project outwardly through the casing or housing 58, the former extending beyond the end of the latter and carrying pulley 50 which is keyed and removably locked to the outer end of said shaft 59. The outer end of shaft 63 is keyed to pulley 49.

Preferably, but not necessarily, there is brake mechanism which tends to keep the two shafts 59 and 63 rotating in synchronism, which may be overcome to provide for their phase adjustment. One form of such brake mechanism is illustrated particularly in Figs. 5 and 6 of the drawings and includes a brake drum 67 formed integral with pulley 50, and a brake band 68 which is attached to pulley 49 by a pin 69, the braking action of said band 68 being adjustable as by adjustable screw mechanism 70. A gear 71 is keyed to the left-hand end of shaft 63, as viewed in Fig. 6, or, in other words, adjacent the eccentric weight 64.

The two eccentric or unbalanced weights 60 and 64 constitute what in effect is a single composite weight or mass in which, during the operation of the head, said two weights 60 and 64 rotate in synchronism. As a consequence the effective force or the effective amplitude of vibration developed thereby will be determined by their combined actions. Their weights and radii are so calculated that when their centers of gravity are diametrically opposite, as they are in the positions illustrated in Figs. 6 and 7 of the drawings, they substantially neutralize each other so that during rotation they produce substantially zero vibratory force. This obviously is only one illustration of the minimum vibratory force which may be effected, depending upon the design of these two eccentric or unbalanced weights.

If, however, the relative phase relation of the two eccentric weights 60 and 64 is shifted 180° from that illustrated in Figs. 6 and 7, their vibratory forces will be added and a maximum vibratory force will be produced for rotation at any given speed. If the vibratory head 47 included only the mechanism so far described, it would produce a non-rectilinear or generally circular vibratory motion when driven. It is to be understood that within certain broad aspects of my invention this type of non-rectilinear vibratory head is embraced. In such a structure, of course, the gears 61 and 71 are not required and would be omitted.

However, in more specific aspects of the invention I prefer to provide a head which will produce rectilinear vibratory motion, since this is particularly desirable with conveyers and in some types of screens, barrel packers, shakeouts, and the like. To this end, within the casing 58 there is a second vibratory assembly which is similar in many respects to that above described. It includes a shaft 72 provided with an eccentric or unbalanced weight 73 having a gear 74 keyed to the left-hand end, the hub of which is mounted in an anti-friction roller bearing 75 carried in a cup of the casing 58. Gear 74 meshes with and is driven by gear 61 and they are preferably so intermeshed that the vibratory rectilinear force which they produce in combination is at right angles to a plane passing through the axes of shafts 59 and 72. It is obvious that the gears 61 and 74 cause these weights 60 and 73 to rotate in opposite directions so that once said gears 61 and 74 are intermeshed the axis of the vibratory forces produced by them will be fixed. This axis may be shifted by disengaging gears 61 and 74 and changing their mesh.

Journaled on the shaft 72 is a split eccentric or unbalanced weight 76 which is similar to the unbalanced weight 64, it having a shaft 77 which is concentric with the shaft 72 and is journaled thereon and is received in an anti-friction roller bearing 78 in a cup in the casing 58.

Shaft 77 carries a gear 79 which is keyed thereto and which meshes with the gear 71. It may be mentioned that all of the gears 61, 71, 74 and 79 are the same size. The intermeshing gears 71 and 79 provide for the driving of the eccentric 76 from the driven shaft 63, and gears 71 and 79 are so meshed that the axis of vibration of the rectilinear vibratory force produced by them is coincidental with that produced by the weights 60 and 73.

It is obvious that since weights 60 and 73 are geared together and since weights 64 and 76 are geared together, adjustment of the phase relation between weights 60 and 64 will automatically similarly adjust the phase relation between weights 73 and 76. As a consequence of this fact, by overcoming the frictional driving relation between the two shafts 59 and 63 provided by the brake mechanism 68, it is possible to adjust the phase relation between weights 60 and 73 on the one hand and weights 64 and 76 on the other, to adjust the force produced by the head 47 when the unbalanced weight assemblies are rotating, this adjustment being possible between minimum and maximum values, the minimum value preferably being zero, in which the unbalanced forces produced by the weights 60 and 73 balance the forces produced by the weights 64 and 76.

Figure 8:
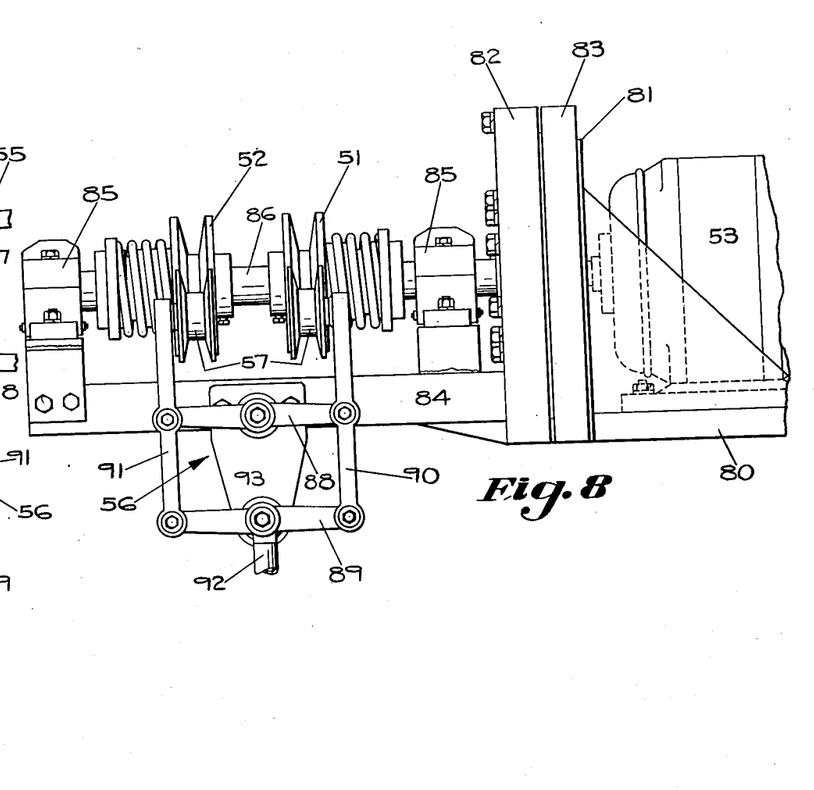
Fig. 8 is an elevational view of the drive mechanism and the phase adjusting mechanism of the drive illustrated in Figs. 2 and 4 of the drawings.
Figure 9:
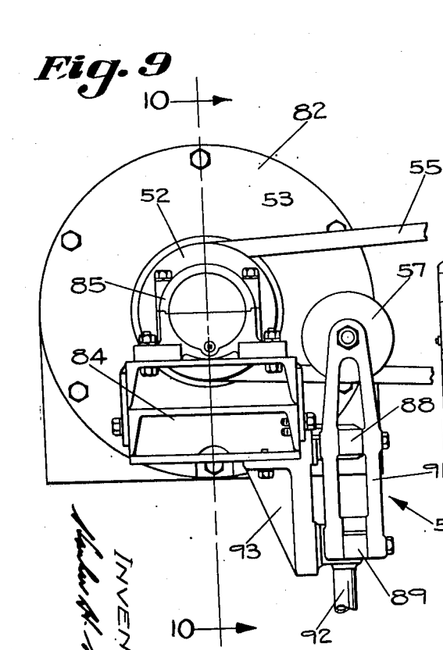
Fig. 9 is an end view of the apparatus of Fig. 8.
Figure 10:
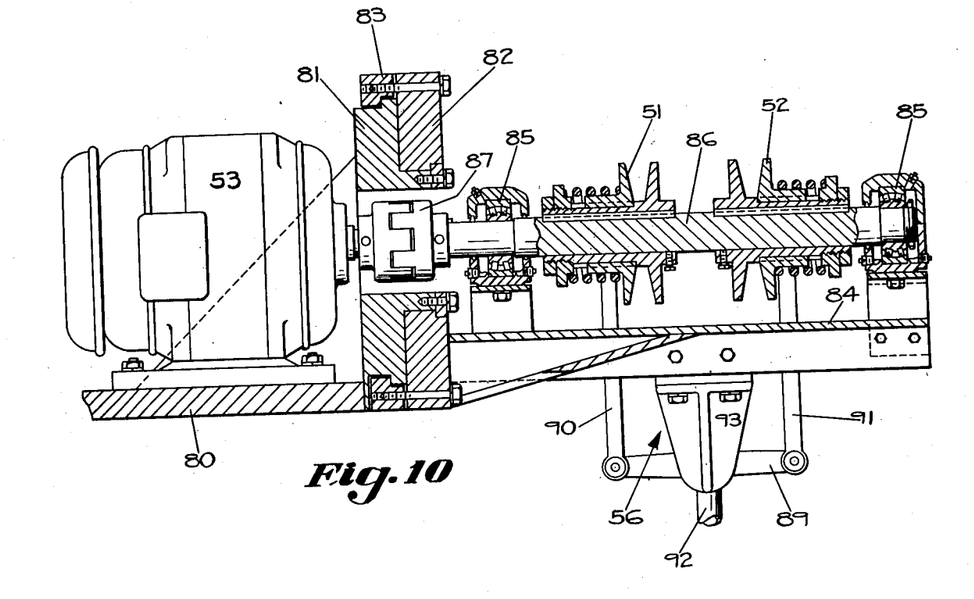
Fig. 10 is a sectional view on the line 10—10 of Fig. 9, with the driving motor shown in elevation.

Attention is now directed to Figs. 8, 9, and 10 of the drawings and to the driving mechanism for the driven pulleys 49 and 50 and their associated shafts 63 and 59, respectively, which is designed so as normally to drive the two pulleys 49 and 50 in synchronism, but which may be adjusted so as to change the phase relation between these shafts and consequently adjust the phase relation between unbalanced weights 60 and 73 and unbalanced weights 64 and 76.

The electric driving motor 53 is preferably mounted on a base 80 to which a cylindrical front plate 81 is attached. Mounted for rotary adjustment on the plate 81 is a second plate 82 provided with a clamping ring 83 by which plate 82 may be attached to plate 81 in any position of adjustment, this adjustment being about the axis of the rotor of motor 53. Plate 82 carries a platform 84 carrying spaced anti-friction bearings 85 which support a pulley shaft 86 driven from motor 53 through a flexible coupling 87. Mounted on the shaft 86 are the previously mentioned spring loaded pulleys 51 and 52, the effective diameters of which may be adjusted by adjusting the tension of the cooperating V-belts 54 and 55.

The previously mentioned idler rollers 57 which roll on the belts 54 and 55 are mounted on the previously mentioned phase shifting mechanism 56 which includes a parallel motion mechanism formed by spaced centrally pivoted arms 88 and 89, the outer ends of which are pivotally connected to upstanding arms 90 and 91, the upper free ends of which carry the rollers 57, there being a roller 57 in alignment with each of the pulleys 51 and 52 and in contact with the associated belts 54 and 55. Centrally pivoted arm 89 has an integral downwardly extending handle 92 which may be shifted laterally in reverse direction selectively to spread one of the spring-pressed pulleys 51 or 52, thereby to modify its normal driving ratio to its driven pulley 49 or 50 to effect a phase adjustment of the shafts 59 and 63 and control eccentric or unbalanced weights 60, 64, 73 and 76.

The idler rollers or pulleys 57 may or may not preload the belts 54 and 55 and thus preload the adjustable pulleys 51 and 52, depending upon desired conditions. If preloading is desired, the phase shifting mechanism 56 is so adjusted that these pulleys normally deflect the associated belts 54 and 55. If no preloading is desired, they merely roll idly thereon without any normal deflection. The action of the phase shifting mechanism 56 is slightly different, depending upon whether it preloads the belts 54 and 55 or does not preload them. If it preloads the belts, the operation of the handle 92 in either of its reverse directions will simultaneously increase the tension on one of the arms and decrease the tension on the other, which will simultaneously increase the effective diameter of one of the pulleys 51 or 52 and decrease the effective diameter of the other. On the other hand, if no preloading of the belt is effected by phase shifting mechanism 56, when handle 92 is operated in one direction it will merely deflect one belt without affecting the other at all, and only one of the pulleys 51, 52 will have its effective diameter decreased.

Another effect of the preloading is that the phase shifting mechanism acts as a compensator to compensate for any differences in the driving ratios of the shafts 59 and 63 which may be due to small differences in the effective diameters of the pulleys 51, 52 or of the pulleys 49, 50. Also the preloaded phase adjusting mechanism 56 will require less shifting of the handle 92 to give the same phase shift between the shafts 59 and 63.

As illustrated in the drawings, both of the pulleys 51 and 52 are spring loaded and this is desirable to the end that during operation of the vibratory mechanism it is possible to adjust the amplitude of vibration or the developed force either to increase it or decrease it from any position intermediate its two extreme positions. However, it is obvious that in certain broader aspects of the invention only one spring-loaded pulley and associated mechanism may be employed. In such an instance the phase relation of the two shafts 59 and 63 and their controlled unbalanced weights may be adjusted, but from any given position of adjustment they can only be adjusted in one direction and not in reverse directions. For example, if the unit is operating at half its maximum amplitude and the phase adjusting mechanism was such that it only operated to increase the amplitude, it would be necessary for the operator to adjust the throw to the maximum and then reduce it below half its maximum in case he desired an ultimate amplitude which was less than that of the original setting, namely, half amplitude. It is also to be noted that the spring-loaded pulleys are preferably the driving pulleys, though it is evident that the driven pulleys may be the spring-loaded ones, if desired.

As clearly illustrated in Figs. 8, 9 and 10 of the drawings, the phase shifting mechanism 56 is all mounted on a bracket 93 which is carried on the platform 84. The purpose of the adjustable mounting of the plate 82 and platform 84 with respect to the base 80 and plate 81 is two-fold. First of all, it allows swinging of the platform 84 and phase adjusting mechanism 56 so that the pulleys 57 may either preload the belts 54, 55, as above mentioned, or may roll idly thereover without preloading them. In addition, this adjustment provides for the belts 54 and 55 extending from the pulleys 51 and 52 at different angles to the vibratory head. As illustrations of two different angles which the belts may take, it is to be noted that in Fig. 1 of the drawings the general plane of the belts is downwardly from the axis of the drive pulleys, while in the installation of Fig. 2 the axis of the belts is inclined upwardly relative to the axis of the drive pulleys. These two would require quite different settings of the phase adjusting mechanism 56 if it were employed to drive the heads. Obviously the head 47 and drive mechanism disclosed in Fig. 2 may be positioned as illustrated in Fig. 1 as well as a great variety of other positions.

Figure 11:
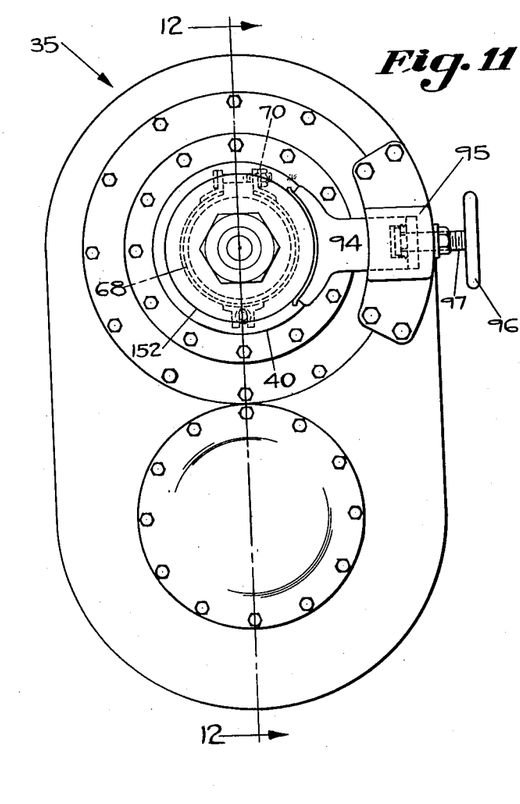
Fig. 11 is an end view of the driving head of Fig. 1.
Figure 12:
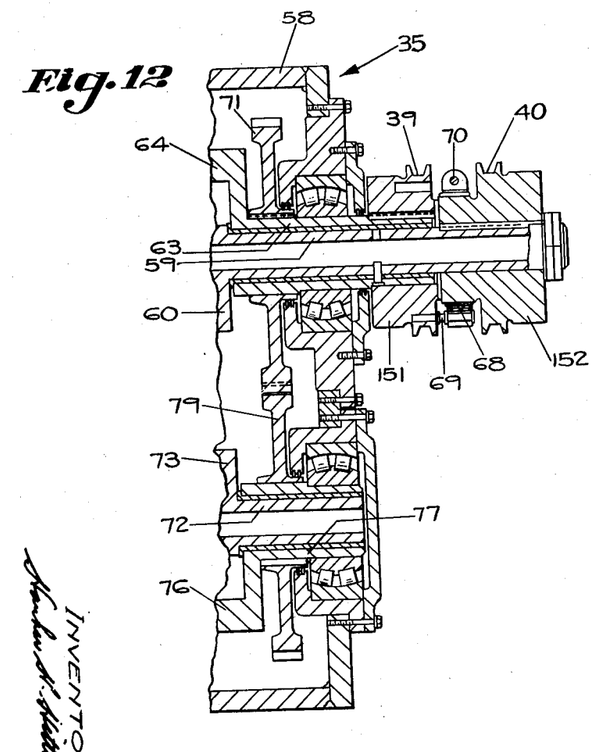
Fig. 12 is a sectional view of a portion of the driving head of Fig. 11.

In Figs. 11 and 12 of the drawings there is illustrated the head 35 which is shown in Fig. 1 of the drawings, with the drive illustrated in Figs. 1 and 3. This head is the same in structure as the head 47 shown in detail in Fig. 6, except for such differences as shall now be pointed out. The shafts 59 and 63 are elongated somewhat to receive pulleys 39 and 40 which replace pulleys 49 and 50, respectively. The pulleys 39 and 40 have integral brake drums 151 and 152, respectively. There is an individual hand operated brake mechanism associated with each of the drums 151 and 152, the outer of these brakes being seen at 94 in cooperation with the brake drum 152. Brake mechanism 94 includes a channel-like supporting bracket 95 which is attached to the casing 58 and is provided with an operating handle 96 which controls a threaded shaft 97 for adjusting the brake mechanism 94 toward and from the drum 152. Similarly individually operable brake mechanism is also preferably provided for the drum 151, being mounted on the same bracket 95. This brake mechanism is the phase shifting mechanism for this particular drive and consequently the phase shifting mechanism 56 previously described is eliminated, the two pulleys 39 and 40 being directly driven from the driving motor 37 by independent pulleys 38 and belts 41 and 42, as illustrated in Fig. 3 of the drawings.

To effect adjustment of the phase relation of shafts 59 and 63 and the shafts 72 and 77 and their rigidly attached eccentric weights by this mechanism, one of the brakes 94 is applied until the brake 68 slips, thus producing a phase shift between the shafts 59 and 63. The two individual brake mechanisms for the separate drums 151 and 152 are preferably provided so that the amplitude of vibration or the force may be adjusted selectively in either of opposite directions from any position between the maximum and minimum adjustments. That is, if the brake associated with drum 152 is applied when the amplitude is half of maximum, an increase in amplitude may be effected. Conversely, if the brake associated with drum 151 is applied, a decrease in amplitude may be directly effected.

Obviously within broader aspects of the invention only a single brake need be employed, for example, drum 151 alone need be provided with associated brake mechanism. In this case the phase shifting may take place to change from any given amplitude to any other given amplitude, but it must be effected in only one direction of adjustment similar to that above described for the adjustment of head 47, where only one spring-pressed pulley is employed.

Figures 13, 14, 15:
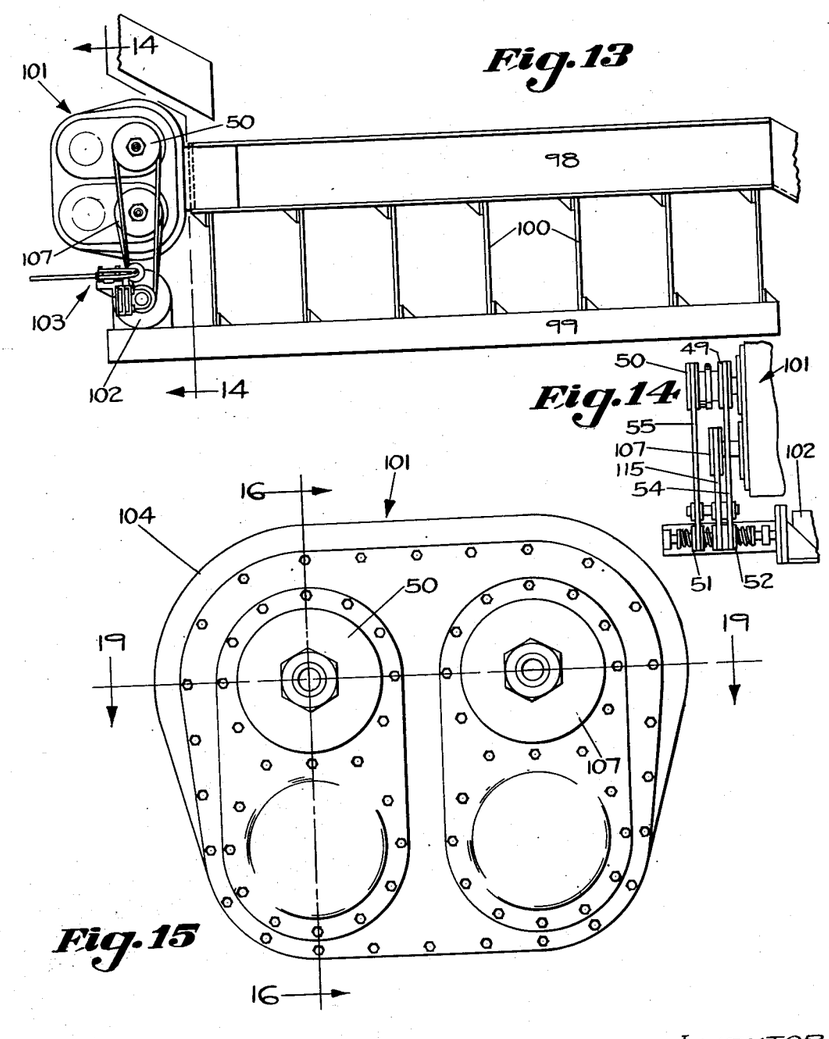
Fig. 13 is a side elevational view of a conveyer representing another embodiment of my invention which is provided with a variable throw or variable force vibratory head.
Fig. 14 is a diagrammatic view on the line 14—14 of Fig. 13, showing the drive between the motor and the head.
Fig. 15 is an end view of the driving head of Fig. 13.

In Fig. 13 of the drawings there is illustrated a conveyer including a deck 98 mounted from a base 99 by vertical spring cantilevers 100. A head 101 is provided which produces rectilinear differential motion which is adjustable in amplitude between zero and maximum, while the machine is in operation. Conveying action is produced by virtue of this differential motion. The head 101 is driven by a motor 102 which may be mounted on the base 99 and the amplitude of vibration of the deck may be controlled, while the machine is in operation, by phase shifting mechanism 103.

The head 101 includes a casing or housing 104 within which there is a double differential rectilinear reciprocating or vibrating mechanism including four sets of unbalanced weights, two of which are of composite construction and all of which are geared to rotate together, with a pair of the unbalanced weights which are not of composite construction being so geared as to rotate at twice the speed of the composite weight associated therewith to produce the differential motion. The two composite unbalanced weight assemblies may be identical with the composite unbalanced weight assemblies heretofore described, such as those illustrated in Fig. 6 and Fig. 12 of the drawings. The composite unbalanced weight assemblies therefore need no special description and will merely be generally designated by the reference characters 105, 106, respectively.

Figure 19:
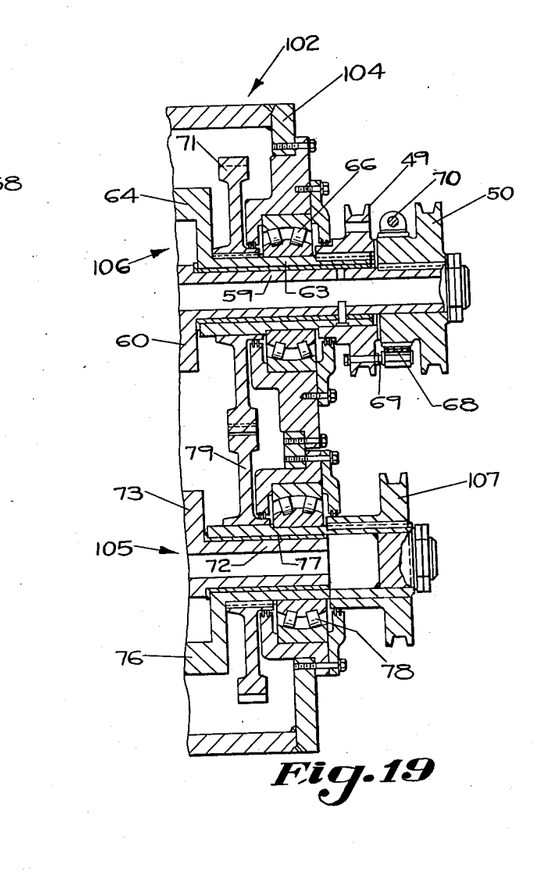
Fig. 19 is a sectional view on the line 19—19 of Fig. 15, showing only the end.

In view of the similarity of these parts in the head 101, the same reference characters are used to designate the elements as those in connection with the previously described head. There is one difference which may optionally be employed or omitted, which is evident from a comparison of Figs. 6 and 19; that is, the shaft 77 may extend through the casing 104 and be provided with a drive pulley 107. If and when this pulley 107 is employed, it will be evident that the shafts 63 and 77 will be driven through two belts and pulleys, while the shafts 59 and 72 are driven through a single belt and pulley.

The desirability of the two belts and pulleys for the shafts 63 and 77 lies in the fact that in the head 101 there is a pair of additional non-composite or single unbalanced weights which are driven directly by these shafts through the gears 71 and 79. This is clearly illustrated by reference to Figs. 16 and 18 of the drawings. That is, gear 71 meshes with and drives a gear 108 (see Fig. 16) which is keyed to and drives a shaft 109 having an integral eccentric or unbalanced weight 110 formed thereon, the shaft 109 being journaled at opposite ends in bearings 111 and 112 in the casing or housing 104.

Figures 16, 17, 18:
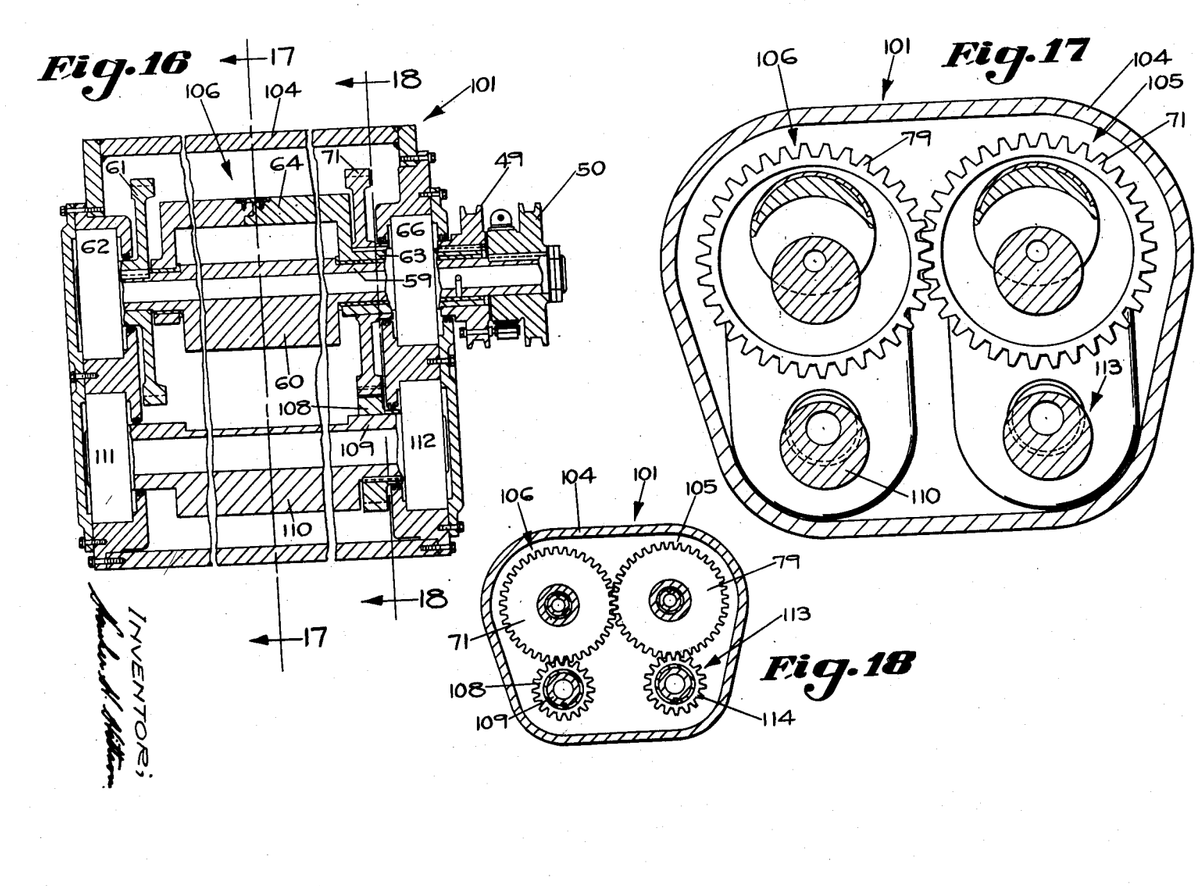
Fig. 16 is a sectional view on the line 16—16 of Fig. 15.
Fig. 17 is a sectional view on the line 17—17 of Fig. 16.
Fig. 18 is a sectional view on the line 18—18 of Fig. 16.

The gear 108 is smaller than the gear 71 and preferably the pitch diameter of gear 108 is half that of gear 71. As a consequence, eccentric or unbalanced weight 110 will make two revolutions for every revolution of the composite weight 60, 64 and this will produce a differential motion of a well known type so as to effect a conveying action on the deck 98 even though it is mounted on substantially upright cantilevers 100.

It is, of course, evident that there should be two sets of these differential unbalanced weights, otherwise the produced motion will not be rectilinear but will be substantially circular. However, it is within certain broad aspects of my invention to employ a head having only one composite weight, such as weight 60, 64, and one single unbalanced weight, such as weight 110.

Associated with the composite unbalanced weight 105 I provide a second single and unbalanced weight 113 which is substantially identical in structure with the unbalanced weight mechanism 109—112, it having a driving gear 114 meshing with and driven by the gear 79, gear 114 preferably having half the pitch diameter of gear 79 for reasons obvious from the above description.

Viewing the structure of the head 101 in a slightly different manner it is evident that the upper portion thereof, as viewed for example in Fig. 17 of the drawings, may be considered as providing essentially the structure of the head disclosed in detail in Fig. 6, including a pair of composite unbalanced weights which normally rotate in synchronism, whose phase relation may be adjusted to adjust the amplitude of vibration produced from a maximum to a minimum, the minimum preferably being zero.

Also within the head there is a second pair of unbalanced weights, each driven by one of the first pair of composite unbalanced weights 105, 106, the second pair of unbalanced weights being simple or non-composite in structure. Each pair of unbalanced weights as thus considered, that is, considering the composite unbalanced weights 105, 106 as one pair and the non-composite unbalanced weights 109—110 and 113 as the second pair, tends to produce rectilinear vibratory motion along the same axis which is along an axis at right angles to a plane passing through the axes of the composite unbalanced weights 105 and 106 and also at right angles to a plane passing through the axes of the weights 109, 110 and 113.

Adjustment of the effective weight of each of the composite weights 105, 106 is made substantially as above described in connection with the head 47. Of course, there is no adjustment of the effective weights of the high speed weights 109, 110 and 113.

It is not possible with the head 101 to adjust the phase relation of shafts 59 and 63 and shafts 72 and 77 so as to reduce the amplitude of vibration to zero, because even though the vibratory energy of the composite weights 105 and 106 may be reduced to zero, the vibratory energy of the weights 109, 110 and 113 still persists. However, the conveying action of the conveyer deck 98 may be reduced to zero because upon reducing the vibratory energy of composite weights 105 and 106 to zero, there will be substantially no differential motion imparted to the conveyer deck 98, as a consequence of which there will be no actual conveying because it is dependent upon the presence of this differential motion.

Figure 20:
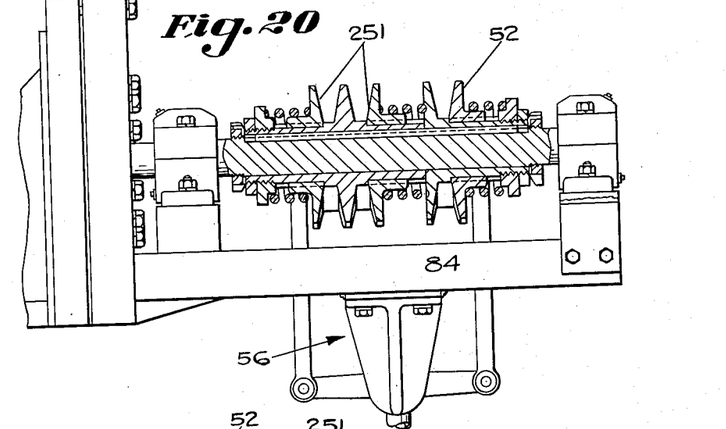
Fig. 20 is an elevational view, with parts in section, of the motor driven pulleys of the drive of Figs. 13 and 14 and associated apparatus.
Figure 21:
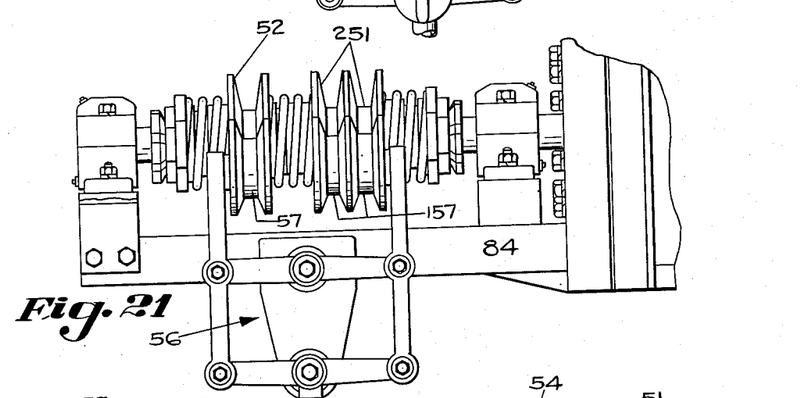
Fig. 21 is a front elevational view of the drive apparatus of Fig. 20.

The phase shifting mechanism employed with the head 101, when the additional pulley 107 is employed, differs only slightly from the phase shifting mechanism illustrated in Figs. 8, 9 and 10 above described. However, it is illustrated in detail in Figs. 20 and 21 of the drawings and includes a double spring loaded pulley 251 which replaces the previous single pulley 51. The other parts of the drive and phase shifting mechanism are the same as those above described except that the phase shifting mechanism now includes a double idler pulley 157 which cooperates with the two V-belts 54 and 115 (see Fig. 14) which drive the pulleys 49 and 107, respectively.

Figure 22:
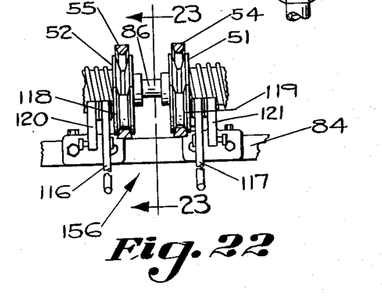
Fig. 22 shows a modified form of drive mechanism which may be substituted for the drive of Figs. 8 and 9.
Figure 23:
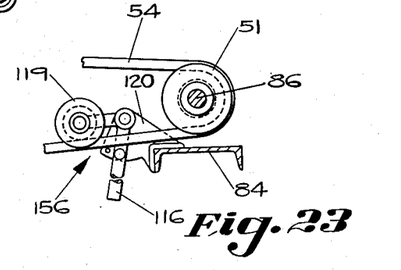
Fig. 23 is a sectional and elevational view on the line 23—23 of Fig. 22.

In Figs. 22 and 23 of the drawings I have shown a modified form of phase shifting mechanism generally designated 156 which may be substituted for the previously described phase shifting mechanism 56, all other structure of the motor and drive pulleys 51 and 52 being preserved.

Instead of the parallel motion mechanism of the phase shifting apparatus 56 I employ an individual crank lever 116 and 117 for each of two idler pulleys 118 and 119 associated with the belts 55 and 54, respectively. The crank levers 116 and 117 are pivotally mounted on brackets 120 and 121 carried on the base or platform 84. It is obvious that either of the levers 116 or 117 may be swung about its pivot to adjust the tension of the associated belt 55 or 54, thereby adjusting the effective diameter of the spring loaded drive pulley 51 or 52 and overcoming the normal locking frictional connection between the driven pulleys 49 and 50 provided by the brake 68. In some instances it may be unnecessary to use brake mechanism 68 and merely rely upon the friction between the shafts 59 and 63 to maintain them in their normal synchronous relation.

From the above description of the various features of my invention it is obvious that one outstanding feature is the fact that the vibratory head, whether it is of double construction so as to produce rectilinear motion, or of single construction so as to produce non-rectilinear or substantially rotary motion, includes two relatively adjustable rotating unbalanced weights which are driven by separate drive shafts. Furthermore, these drive shafts are so interconnected that they normally travel together or in synchronism so that the two relatively adjustable weights in effect act as a single unbalanced weight which produce a vibratory motion or force determined by the vector sum of the two individual vibratory forces.

Furthermore, by adjusting the phase relation between these two rotating unbalanced weights, such as by causing one to travel at a different speed temporarily than the other, by the simple expedient of driving one of the concentric shafts at a different speed than the other, it is possible to adjust the vibratory force produced while the machine is in operation. I have disclosed various specific mechanisms for effecting this normal synchronous rotation of these unbalanced or eccentric weights which is capable of adjusting their phase relation.

It is evident that other specific means may likewise be employed for this purpose within the realm of my invention in certain of its broad aspects. As one illustration of additional means, the patent to W. E. Ewart, No. 2,247,153, dated June 24, 1941, shows a mechanism for driving two shafts 20 and 39 at speeds which may be in synchronism or slightly different. Such a mechanism might be employed so as to drive the shafts 59 and 63 within certain broad aspects of my invention, though in more specific aspects of the invention I prefer the apparatus disclosed in this application.

Another illustration of a prior art device which might be employed to drive the shafts 59 and 63 normally in synchronism but selectively asynchronously is that portion of the patent to Heyer et al., No. 2,164,818, dated July 4, 1939, by which the shafts 13 and 19 may be so driven. In other words, it is the asynchronous driving of the two shafts 59 and 63 by some mechanism which provides for adjustment of the amplitude of vibration of the composite unbalanced weights or the forces produced thereby by simple drive mechanism preferably including non-positive drives of the belt type, which particularly distinguish my invention in its broad aspects from prior known devices.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. Vibratory mechanism including a deck frame to be vibrated, a vibratory head attached to said frame to impart vibratory motion thereto, said vibratory head including a head frame, a pair of similar eccentric weights mounted for rotation on said head frame, gearing interconnecting said pair of weights providing for their rotation in synchronized opposite directions to develop a resultant periodic substantially rectilinear vibratory force, means for driving said pair of weights, a second pair of similar eccentric weights mounted for rotation on said head frame, gearing interconnecting said second pair of weights providing for their rotation in synchronized opposite directions to develop a resultant periodic substantially rectilinear vibratory force, means for driving said second pair of weights at least in part separate from the driving means for said first pair of weights, said two driving means acting normally to drive the two pair of weights in synchronism, and control means operative to alter the action of said two driving means whereby one pair of weights is driven at a different speed from the other pair thereby altering the phase relation of the resulting vibrating forces of the two pair of weights to adjust the resulting amplitude of vibration of said deck frame, each of said driving means including a belt and a driving head pulley, said control means including mechanism for driving one of said pulleys at a different speed than the other including a brake for retarding the rotation of one of said pulleys and causing its driving belt to slip.

2. Vibratory mechanism including a deck frame to be vibrated, a vibratory head attached to said frame to impart vibratory motion thereto, said vibratory head including a head frame, a pair of similar eccentric weights mounted for rotation on said head frame, gearing interconnecting said pair of weights providing for their rotation in synchronized opposite directions to develop a resultant periodic substantially rectilinear vibratory force, means for driving said pair of weights, a second pair of similar eccentric weights mounted for rotation on said head frame, gearing interconnecting said second pair of weights providing for their rotation in synchronized opposite directions to develop a resultant periodic substantially rectilinear vibratory force, means for driving said second pair of weights at least in part separate from the driving means for said first pair of weights, said two driving means acting normally to drive the two pair of weights in synchronism, and control means operative to alter the action of said two driving means whereby one pair of weights is driven at a different speed from the other pair thereby altering the phase relation of the resulting vibrating forces of the two pair of weights to adjust the resulting amplitude of vibration of said deck frame, each of said driving means including a belt and a driving head pulley, said control means including mechanism for driving one of said pulleys at a different speed than the other including a variable diameter pulley and means for adjusting its diameter.

3. Vibratory mechanism including a deck frame to be vibrated, a vibratory head attached to said frame to impart vibratory motion thereto, said vibratory head including a head frame, a pair of similar eccentric weights mounted for rotation on said head frame, gearing interconnecting said pair of weights providing for their rotation in synchronized opposite directions to develop a resultant periodic substantially rectilinear vibratory force, means for driving said pair of weights, a second pair of similar eccentric weights mounted for rotation on said head frame, gearing interconnecting said second pair of weights providing for their rotation in synchronized opposite directions to develop a resultant periodic substantially rectilinear vibratory force, means for driving said second pair of weights at least in part separate from the driving means for said first pair of weights, said two driving means acting normally to drive the two pair of weights in synchronism, and control means operative to alter the action of said two driving means whereby one pair of weights is driven at a different speed from the other pair thereby altering the phase relation of the resulting vibrating forces of the two pair of weights to adjust the resulting amplitude of vibration of said deck frame, each of said driving means including a belt and a driving head pulley, said control means including mechanism for driving one of said pulleys at a different speed than the other including a spring loaded variable diameter pulley and means for adjusting the tension on one of said belts to adjust the diameter of said spring loaded pulley.

4. Vibratory mechanism including a deck frame to be vibrated, a vibratory head attached to said frame to impart vibratory motion thereto, said vibratory head including a head frame, a pair of similar eccentric weights mounted for rotation on said head frame, gearing interconnecting said pair of weights providing for their rotation in synchronized opposite directions to develop a resultant periodic substantially rectilinear vibratory force, means for driving said pair of weights, a second pair of similar eccentric weights mounted for rotation on said head frame, gearing interconnecting said second pair of weights providing for their rotation in synchronized opposite directions to develop a resultant periodic substantially rectilinear vibratory force, means for driving said second pair of weights at least in part separate from the driving means for said first pair of weights, said two driving means acting normally to drive the two pair of weights in synchronism, and control means operative to alter the action of said two driving means whereby one pair of weights is driven at a different speed from the other pair thereby altering the phase relation of the resulting vibrating forces of the two pair of weights to adjust the resulting amplitude of vibration of said deck frame, each of said driving means including a belt and a driving head pulley, said control means including mechanism for driving one of said pulleys at a different speed than the other.

5. Vibratory mechanism including a deck frame to be vibrated, a vibratory head attached to said frame to impart vibratory motion thereto, said vibratory head including a head frame, a pair of similar eccentric weights mounted for rotation on said head frame, gearing interconnecting said pair of weights providing for their rotation in synchronized opposite directions to develop a resultant periodic substantially rectilinear vibratory force, means for driving said pair of weights, a second pair of similar eccentric weights mounted for rotation on said head frame, gearing interconnecting said second pair of weights providing for their rotation in synchronized opposite directions to develop a resultant periodic substantially rectilinear vibratory force, means for driving said second pair of weights at least in part separate from the driving means for said first pair of weights, said two driving means acting normally to drive the two pair of weights in synchronism, and control means operative to alter the action of said two driving means whereby one pair of weights is driven at a different speed from the other pair thereby altering the phase relation of the resulting vibrating forces of the two pair of weights to adjust the resulting amplitude of vibration of said deck frame, each of said driving means including a belt and a driving head pulley.

6. Vibratory mechanism including a deck frame to be vibrated, a vibratory head attached to said frame to impart vibratory motion thereto, said vibratory head including a head frame, a pair of similar eccentric weights mounted for rotation on said head frame, gearing interconnecting said pair of weights providing for their rotation in synchronized opposite directions to develop a resultant periodic substantially rectilinear vibratory force, means for driving said pair of weights, a second pair of similar eccentric weights mounted for rotation on said head frame, gearing interconnecting said second pair of weights providing for their rotation in synchronized opposite directions to develop a resultant periodic substantially rectilinear vibratory force, means for driving said second pair of weights at least in part separate from the driving means for said first pair of weights, said two driving means acting normally to drive the two pair of weights in synchronism, and control means operative to alter the action of said two driving means whereby one pair of weights is driven at a different speed from the other pair thereby altering the phase relation of the resulting vibrating forces of the two pair of weights to adjust the resulting amplitude of vibration of said deck frame.

7. A vibrator including a head frame, a composite adjustable force eccentric assembly mounted therein for rotation including a pair of eccentrics mounted for rotation on a common axis, one of said eccentrics being angularly adjustable relative to the other to adjust the effective eccentric weight of the assembly, independent drive shafts for said eccentrics, and belt and pulley drive means for driving said shafts selectively in synchronism and asynchronism.

8. A vibrator including a head frame, a composite adjustable force eccentric assembly mounted therein for rotation including a pair of eccentrics mounted for rotation on a common axis, one of said eccentrics being angularly adjustable relative to the other to adjust the effective eccentric weight of the assembly, independent drive shafts for said eccentrics, and belt and pulley drive means for driving said shafts selectively in synchronism and asynchronism, said drive means including a variable diameter pulley and means for adjusting its diameter.

9. A vibrator including a head frame, a composite adjustable force eccentric assembly mounted therein for rotation including a pair of eccentrics mounted for rotation on a common axis, one of said eccentrics being angularly adjustable relative to the other to adjust the effective eccentric weight of the assembly, independent drive shafts for said eccentrics, and belt and pulley drive means for driving said shafts selectively in synchronism and asynchronism, said drive mechanism including brake mechanism for at least one of said drive shafts applicable to cause it to rotate at a slower speed than the other.

10. Vibratory apparatus including a frame to be vibrated, mechanism constructed and arranged to vibrate said frame at a variable amplitude which may be adjusted while in operation including a pair of eccentrics one mounted to rotate within the other, means mounting said eccentrics for rotation on concentric axes, a motor, separate drives extending from said motor to each of said eccentrics including belt and pulley means, said separate drives being so proportioned as normally to drive said two eccentrics in synchronism, and means operable to cause one of said eccentrics to slip relative to the other during operation thereby adjusting the combined vibratory effect of said two eccentrics, said last named means including brake mechanism for at least one of said eccentrics.

11. Vibratory apparatus including a frame to be vibrated, mechanism constructed and arranged to vibrate said frame at a variable amplitude which may be adjusted while in operation including a pair of eccentrics one mounted to rotate within the other, means mounting said eccentrics for rotation on concentric axes, a motor, separate drives extending from said motor to each of said eccentrics including belt and pulley means, said separate drives being so proportioned as normally to drive said two eccentrics in synchronism, and means operable to cause one of said eccentrics to slip relative to the other during operation thereby adjusting the combined vibratory effect of said two eccentrics, said last named means including a variable diameter pulley and means for adjusting its diameter while in operation.

12. Vibratory apparatus including a frame to be vibrated, mechanism constructed and arranged to vibrate said frame at a variable amplitude which may be adjusted while in operation including a pair of eccentrics one mounted to rotate within the other, means mounting said eccentrics for rotation on concentric axes, a motor, separate drives extending from said motor to each of said eccentrics including belt and pulley means, said separate drives being so proportioned as normally to drive said two eccentrics in synchronism, and means operable to cause one of said eccentrics to slip relative to the other during operation thereby adjusting the combined vibratory effect of said two eccentrics, said last named means including a spring loaded variable diameter pulley and means for adjusting the tension on one of said belts thereby to adjust the diameter of said pulley.

13. Vibratory apparatus including a frame to be vibrated, mechanism constructed and arranged to vibrate said frame at a variable amplitude which may be adjusted while in operation including a pair of eccentrics one mounted to rotate within the other, means mounting said eccentrics for rotation on concentric axes, a motor, separate drives extending from said motor to each of said eccentrics including belt and pulley means, said separate drives being so proportioned as normally to drive said two eccentrics in synchronism, and means operable to cause one of said eccentrics to slip relative to the other during operation thereby adjusting the combined vibratory effect of said two eccentrics.

14. Vibratory apparatus including a frame to be vibrated, mechanism constructed and arranged to vibrate said frame at a variable amplitude which may be adjusted while in operation including a pair of eccentrics, means mounting said eccentrics for rotation on concentric axes, a motor, separate drives extending from said motor to each of said eccentrics including belt and pulley means, said separate drives being so proportioned as normally to drive said two eccentrics in synchronism, and means operable to cause one of said eccentrics to slip relative to the other during operation thereby adjusting the combined vibratory effect of said two eccentrics.

15. A vibrator head including a pair of eccentrics one within the other, means mounting said eccentrics for rotation on concentric axes, separate driving means for each of said eccentrics, and friction brake mechanism releasably frictionally connecting said drive means together whereby said eccentrics normally rotate in synchronism.

16. A vibrator head including a pair of eccentrics one within the other, means mounting said eccentrics for rotation on concentric axes, separate driving means for each of said eccentrics, and mechanism releasably frictionally connecting said drive means together whereby said eccentrics normally rotate in synchronism.

17. A vibrator head including a pair of eccentrics, means mounting said eccentrics for rotation on concentric axes, separate driving means for each of said eccentrics, and mechanism releasably frictionally connecting said drive means together whereby said eccentrics normally rotate in synchronism.

18. Vibrating mechanism including a motor, two pulleys driven by said motor, two unbalanced weights, means mounting said unbalanced weights for rotation on a common axis, a pulley individual to each weight, two drive belts, one connecting one of said motor driven pulleys with an unbalanced weight pulley, the other connecting the other motor driven pulley with the other unbalanced weight pulley, the sizes of said pulleys being such that normally said two unbalanced weights rotate in synchronism, and means including a friction retarding brake for one of said unbalanced weights operable to adjust the phase relation of said unbalanced weights while they rotate.

19. Vibrating mechanism including a motor, two pulleys driven by said motor, two unbalanced weights, means mounting said unbalanced weights for rotation on a common axis, a pulley individual to each weight, two drive belts, one connecting one of said motor driven pulleys with an unbalanced weight pulley, the other connecting the other motor driven pulley with the other unbalanced weight pulley, the sizes of said pulleys being such that normally said two unbalanced weights rotate in synchronism, and means operable to adjust the phase relation of said unbalanced weights while they rotate.

20. Vibrating mechanism including a motor, two pulleys driven by said motor, two unbalanced weights, means mounting said unbalanced weights for rotation on a common axis, a pulley individual to each weight, two drive belts, one connecting one of said motor driven pulleys with an unbalanced weight pulley, the other connecting the other motor driven pulley with the other unbalanced weight pulley, the sizes of said pulleys being such that normally said two unbalanced weights rotate in synchronism, at least one of said pulleys being a spring loaded adjustable diameter pulley, and means for adjusting the tension on one of said belts to adjust the diameter of said spring loaded pulley during rotation thereof to adjust the phase relation between said unbalanced weights.

21. Vibrating mechanism including a motor, two pulleys driven by said motor, two unbalanced weights, means mounting said unbalanced weights for rotation on a common axis, a pulley individual to each weight, two drive belts, one connecting one of said motor driven pulleys with an unbalanced weight pulley, the other connecting the other motor driven pulley with the other unbalanced weight pulley, the sizes of said pulleys being such that normally said two unbalanced weights rotate in synchronism, a drive pulley for each unbalanced weight being spring loaded adjustable in diameter, means operable to adjust the diameters of said spring loaded pulleys simultaneously and reversely to adjust the phase relation between said unbalanced weights while rotating including an idler roller normally deflecting each belt from its normal path between pulleys, pivoted cross arm means interconnecting said rollers, and means for pivoting said cross arm means to increase the deflection of one of said belts and decrease the deflection of the other.

22. Vibrating mechanism including a motor, two pulleys driven by said motor, two unbalanced weights, means mounting said unbalanced weights for rotation on a common axis, a pulley individual to each weight, two drive belts, one connecting one of said motor driven pulleys with an unbalanced weight pulley, the other connecting the other motor driven pulley with the other unbalanced weight pulley, the sizes of said pulleys being such that normally said two unbalanced weights rotate in synchronism, at least one of said pulleys being a spring loaded adjustable diameter pulley, and means for adjusting the tension on one of said belts to adjust the diameter of said spring loaded pulley during rotation thereof to adjust the phase relation between said unbalanced weights, said last named means including idler pulley means operable to deflect one of said belts.

23. Conveying mechanism including a deck, vibrator mechanism attached to said deck operable to impart rectilinear differential vibratory motion thereto including a frame, four intergeared unbalanced weight mechanisms mounted on said frame for rotary movement, gearing driving two of said weight mechanisms reversely at the same speed and two other weight mechanisms reversely at the same speed and at twice the speed of said first two mechanisms, means for adjusting the effective weights of two of said mechanisms which rotate at the same speeds, each of said two mechanisms including two weights of adjustable eccentricity mounted on separate shafts, control mechanism operable while said mechanisms are rotating to adjust the phase relation between said shafts, said control mechanism including a separate drive pulley for each shaft, and means for temporarily driving them at different speeds.

24. Conveying mechanism including a deck, vibrator mechanism attached to said deck operable to impart rectilinear differential vibratory motion thereto including a frame, four intergeared unbalanced weight mechanisms mounted on said frame for rotary movement, gearing driving two of said weight mechanisms reversely at the same speed and two other weight mechanisms reversely at the same speed and at twice the speed of said first two mechanisms, and means for adjusting the effective weights of two of said mechanisms which rotate at the same speeds.

25. Conveying mechanism including a deck, vibrator mechanism attached to said deck operable to impart rectilinear differential vibratory motion thereto including a frame, four intergeared unbalanced weight mechanisms mounted on said frame for rotary movement, gearing driving two of said weight mechanisms reversely at the same speed and two other weight mechanisms reversely at the same speed and at a different speed than said first two mechanisms, means for adjusting the effective weights of two of said mechanisms which rotate at the same speed, each of said two mechanisms including two weights of adjustable eccentricity mounted on separate shafts, control mechanism operable while said mechanisms are rotating to adjust the phase relation between said shafts, said control mechanism including a separate drive pulley for each shaft, and means for temporarily driving them at different speeds.

26. Conveying mechanism including a deck, vibrator mechanism attached to said deck operable to impart rectilinear differential vibratory motion thereto including a frame, four intergeared unbalanced weight mechanisms mounted on said frame for rotary movement, gearing driving two of said weight mechanisms reversely at the same speed and two other weight mechanisms reversely at the same speed and at a different speed than said first two mechanisms, means for adjusting the effective weights of two of said mechanisms which rotate at the same speeds, each of said two mechanisms including two weights of adjustable eccentricity mounted on separate shafts, and control mechanism operable while said mechanisms are rotating to adjust the phase relation between said shafts.

27. Conveying mechanism including a deck, vibrator mechanism attached to said deck operable to impart rectilinear differential vibratory motion thereto including a frame, four intergeared unbalanced weight mechanisms mounted on said frame for rotary movement, gearing driving two of said weight mechanisms reversely at the same speed and two other weight mechanisms reversely at the same speed and at twice the speed of said first two mechanisms, means for adjusting the effective weights of two of said mechanisms which rotate at the same speeds, each of said two mechanisms including two weights of adjustable eccentricity mounted on separate shafts, and control mechanism operable while said mechanisms are rotating to adjust the phase relation between said shafts.

HARKER H. HITTSON.

REFERENCES CITED

The following references are of record in the file of this patent:

UNITED STATES PATENTS

| Number | Name | Date |
|---|---|---|
| 1,884,246 | Ridderstrom | Oct. 25, 1932 |
| 2,325,248 | Johnstone | June 27, 1943 |